(No Model.)
J. H. GAVIN.
FIXTURE FOR BATH TUBS.
No. 541,843. Patented July 2, 1895.
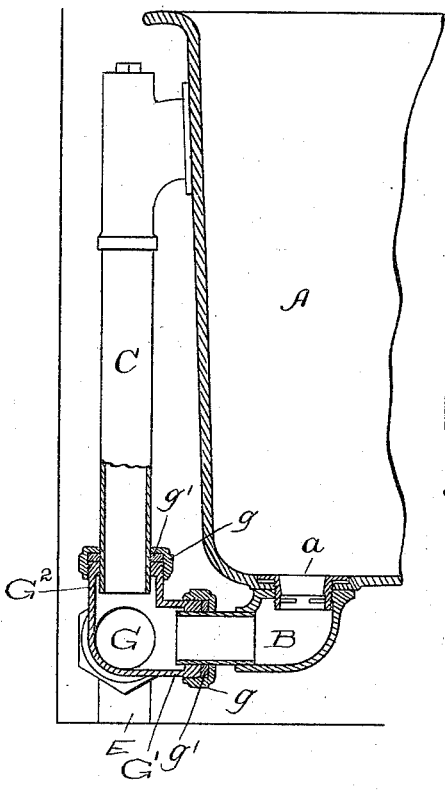
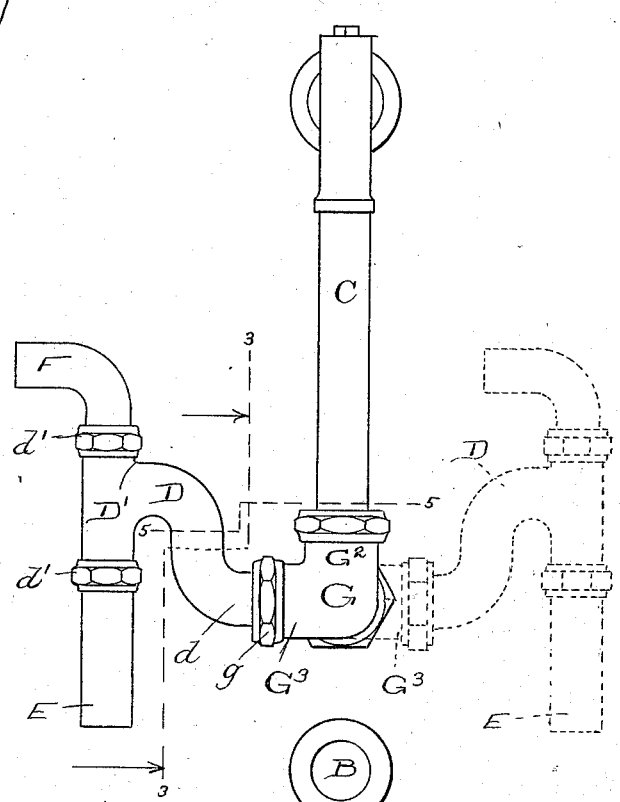
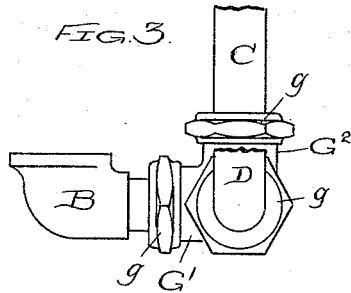
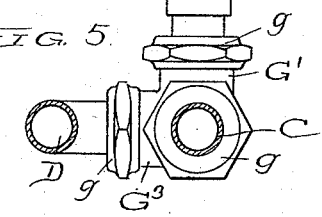
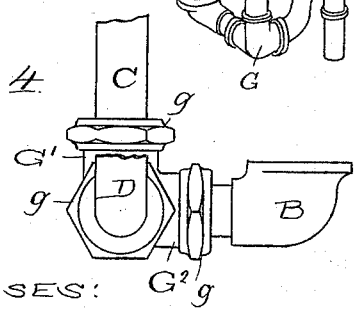
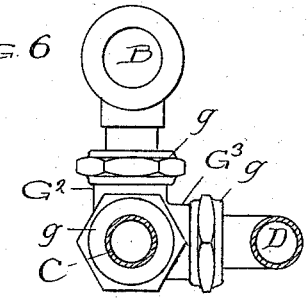
WITNESSES:
INVENTOR:
JOHN H. GAVIN.
By Munday, Evarts & Adcock.
HIS ATTORNEYS.

UNITED STATES PATENT OFFICE.

JOHN H. GAVIN, OF CHICAGO, ILLINOIS, ASSIGNOR TO THE L. WOLFF MANUFACTURING COMPANY, OF SAME PLACE.

FIXTURE FOR BATH-TUBS.

SPECIFICATION forming part of Letters Patent No. 541,843, dated July 2, 1895.

Application filed April 4, 1895. Serial No. 544,430. (No model.)

*To all whom it may concern:*

Be it known that I, JOHN H. GAVIN, a citizen of the United States, residing in Chicago, in the county of Cook and State of Illinois, have invented a new and useful Improvement in Fixtures for Bath-Tubs, of which the following is a specification.

My invention relates to improvements in combined outlet, overflow, trap and waste pipe connections or fixtures for bath tubs.

Heretofore it has been customary, especially in open work or exposed bath tubs standing upon legs, to employ a T connection uniting the outlet, the overflow and the leg of the trap, the stem of the T leading to the outlet, and the other leg of the trap being connected to the waste pipe. This means of connection, in order to give room for the trap, requires the legs of the tub to be made longer and the tub placed higher above the floor than is desirable, and great inconvenience, labor and expense frequently arise because of the impossibility in practice, when the plumber comes to set the tub up, to place it in the exact relation to the fixed waste pipe which the previously made fixtures call for or require; and sometimes too it is found necessary to place the fixture end of the tub in a different corner of the room from that for which the fixtures were designed, thus causing trouble, expense and delay.

The object of my improvement is to overcome these objections or difficulties and provide a combined outlet, overflow, trap and waste fixture for bath tubs, which will be of a simple and efficient construction, enable the legs of the tub to be made much shorter than heretofore, be equally capable of use in whatever corner the tub may be set or the waste pipe located, and which will admit of both horizontal and vertical adjustment of the tub in relation to the fixture.

To this end my invention consists in connection with a bath tub, its outlet pipe, overflow pipe, trap and the waste pipe, of a three-way connection, having one of its horizontal limbs connected to the trap and its other two limbs connected by slip joints, one with the outlet pipe leading to the tub and the other with the overflow pipe, the trap connecting with the waste pipe and with the vent pipe; the joint between the three-way connection and the trap permitting it to be given a quarter turn so that either one or the other two limbs of the three-way connection may be connected either to the vertical overflow pipe or to the horizontal outlet pipe, thus adapting the fixture by a simple turn or adjustment to be used in whatever corner of the room the bath tub may be located or in whatever relative position thereto the waste pipe may be located. By this means also the horizontal limbs of the three-way connection and the outlet pipe are made to constitute a portion of the trap or water seal, and I thus save considerable space heretofore required for the trap and am enabled to mount the tub upon much shorter legs than those heretofore commonly employed.

My invention also consists in the novel devices and novel combinations of parts and devices herein shown and described and specified in the claims.

In the accompanying drawings forming part of this specification, Figure 1 is a vertical section of a device embodying my invention. Fig. 2 is an end view; this figure also showing in dotted lines the fixture turned or adjusted to connect with a waste-pipe at the opposite side or corner from that illustrated in full lines. Fig. 3 is an elevation looking from line 3 3 of Fig. 2 in the direction of the arrow. Fig. 4 is a view similar to Fig. 3, but showing the three-way connection given a quarter turn vertically and a half turn horizontally to adapt it to connect with a tub in a different position. Fig. 5 is a section on line 5 5 of Fig. 2. Fig. 6 is a view similar to Fig. 5, excepting that the three-way connection has been given a quarter turn vertically and a half turn horizontally; and Fig. 7 is a perspective view of the fixture.

In the drawings A represents a bath tub, and $a$ its outlet opening.

B is the outlet pipe; C, the overflow pipe.

D is the trap; E, the waste pipe; F, the vent pipe, and G the three-way connection. The limbs $G'$ and $G^2$ of the connection G are each furnished with a slip joint, consisting preferably of a screw threaded flanged clamp ring $g$ and an elastic packing ring $g'$ to adap them to be adjustably connected to the outlet pipe B and overflow pipe C, either limb with either pipe as may be required according to the relative position of the tub A and waste pipe E. The other limb $G^3$ of the three-way connection is connected by an ordinary packed joint comprising a packing ring and a screw threaded flanged clamp $g$, with the inner or horizontal end of limb $d$ of the trap D, so that the three-way connection may be turned or rotated vertically in respect to the trap to enable the fixture to be turned or adjusted to accommodate different relative positions of the tub A and fixed waste pipe E. The trap D is provided with a two-way connection D' to joint it with the waste pipe E and vent pipe F, the union being made by suitable joints $d'$, $d'$.

As the limbs $G'$ $G^2$ of the three-way connection G are similar, and either adapted to fit the outlet B or the overflow C, and as the three-way connection G can be given a quarter turn vertically in respect to the trap D, it will be seen that then by giving the three-way connection G and the trap D together a half turn, the same fixture is equally adapted for use in whatever corner of the room the bath tub A or waste pipe E may be placed. In the one case as shown in the full lines in Fig. 2 the overflow C connects with the limb $G^2$, and the outlet B with the limb $G'$, while in the other case, as shown in the dotted lines in Fig. 2 and in Figs. 4 and 6, the overflow C connects with the limb $G'$ and the outlet D with the limb $G^2$.

The outlet B is connected to the bath tub A in the usual or any suitable manner, and the upright or standing overflow C is also connected to the bath tub in the customary way.

I claim—

1. The combination with a bath tub, its outlet pipe, overflow pipe, trap, waste pipe and vent pipe, of a three-way connection having one of its horizontal limbs connected to the trap, and its other two limbs furnished with slip joint connections and connected one with the overflow pipe and the other with the outlet pipe, a joint between the three-way connection and the trap to permit said three-way connection being turned in respect to the trap, the trap having a two-way connection for joining the same to the waste pipe, either one of the two slip-joint limbs of the three-way connection being adapted to be connected to either the vertical overflow pipe or the horizontal outlet pipe, thus enabling the fixture to be used in different relative positions of the waste pipe to the bath tub, substantially as specified.

2. The combination with a bath tub, its outlet pipe, overflow pipe, trap and waste pipe, of a three-way connection having one of its horizontal limbs connected to the trap and its other two limbs furnished with slip joint connections, and adjustably connected one with the overflow pipe and the other with the outlet pipe, there being a joint between said three-way connection and the trap to permit said connection to turn in respect to the trap, thus enabling the fixture to be used in different relative positions of the waste pipe to the bath tub, substantially as specified.

JOHN H. GAVIN.

Witnesses:
H. M. MUNDAY,
S. E. CURTIS.